US010097125B2

(12) United States Patent
Zook et al.

(10) Patent No.: US 10,097,125 B2
(45) Date of Patent: Oct. 9, 2018

(54) ALTERNATOR INCLUDING WIRELESS VOLTAGE REGULATOR

(71) Applicant: Remy Technologies, LLC, Pendleton, IN (US)

(72) Inventors: Chad Zook, Anderson, IN (US); Carlvon Cheng, Johor (MY); Michael L. Hull, Anderson, IN (US); Daniel E. Wilkins, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/266,506

(22) Filed: Sep. 15, 2016

(65) Prior Publication Data

US 2017/0077853 A1 Mar. 16, 2017

Related U.S. Application Data

(60) Provisional application No. 62/218,982, filed on Sep. 15, 2015.

(51) Int. Cl.
*H02P 9/48* (2006.01)
*H02P 9/30* (2006.01)
*H04L 12/40* (2006.01)
*H04B 1/40* (2015.01)

(52) U.S. Cl.
CPC ............... *H02P 9/48* (2013.01); *H02P 9/305* (2013.01); *H04B 1/40* (2013.01); *H04L 2012/40234* (2013.01); *H04L 2012/40273* (2013.01)

(58) Field of Classification Search
CPC ... H02P 9/48; H02P 9/305; H04B 1/40; H04L 2012/40234; H04L 2012/40273
See application file for complete search history.

(56) References Cited

U.S. PATENT DOCUMENTS

| 9,739,216 B2* | 8/2017 | Andrejak | F02D 29/06 |
| 2008/0178825 A1* | 7/2008 | Mitchell | F01P 1/06 |
| | | | 123/41.56 |
| 2009/0125176 A1* | 5/2009 | Louise | H02P 9/02 |
| | | | 701/34.4 |
| 2012/0013310 A1* | 1/2012 | Clark | H02J 7/1446 |
| | | | 323/204 |
| 2014/0055081 A1 | 2/2014 | Albsmeier et al. | |
| 2014/0176087 A1* | 6/2014 | Mouni | H02P 9/102 |
| | | | 322/59 |
| 2014/0203788 A1* | 7/2014 | Andrejak | H02P 9/04 |
| | | | 322/14 |
| 2015/0258946 A1* | 9/2015 | Namuduri | B60K 6/40 |
| | | | 307/10.1 |

(Continued)

Primary Examiner — Sean Gugger
(74) Attorney, Agent, or Firm — Maginot, Moore & Beck LLP

(57) ABSTRACT

An alternator configured for use in a vehicle includes a housing, a stator located within the housing, a field coil, a regulator, and a transceiver. The field coil is positioned in proximity to the stator and is configured for rotation relative to the stator. The regulator is electrically connected to the field coil and is configured to supply the field coil with an electrical signal based on a control signal. The transceiver is electrically connected to the regulator and is configured to wirelessly receive the control signal from an engine control module of the vehicle and to transmit the control signal to the regulator.

8 Claims, 3 Drawing Sheets

(56) References Cited

U.S. PATENT DOCUMENTS

| | | | |
|---|---|---|---|
| 2015/0311848 A1* | 10/2015 | Maruyama | H02J 7/163 318/490 |
| 2016/0149527 A1* | 5/2016 | Frampton | H02P 9/00 322/17 |
| 2017/0134183 A1* | 5/2017 | Labiste | H04L 12/40 |

* cited by examiner

ALTERNATOR INCLUDING WIRELESS VOLTAGE REGULATOR

CROSS-REFERENCE TO RELATED APPLICATIONS

The present application claims priority from U.S. provisional patent application Ser. No. 62/218,982, filed Sep. 15, 2015, the entire contents of which are incorporated herein by reference.

FIELD

The present disclosure relates to the field of vehicle electrical systems, and more particularly to vehicle alternators.

BACKGROUND

Alternators convert mechanical energy from a vehicle engine into electrical energy for consumption by the vehicle. The electrical energy produced by the alternator charges the vehicle battery and powers electrical loads on the vehicle.

The alternator generally includes a rotatable field coil positioned within a stator having a plurality of stator windings. Operation of the engine results in rotation of the field coil relative to the stator. Current flowing through the rotating field coil establishes a rotating magnetic field, which induces an AC output voltage in the stator windings. A rectifier of the alternator rectifies the AC voltage. The rectified voltage is supplied to the vehicle battery and the electrical loads on the vehicle.

The typical vehicle alternator includes a voltage regulator, which controls the voltage of the electrical signal supplied to the field coil, among other functions. In general, a higher voltage set point results in more current through the field coil and the rectified output voltage of the alternator increases. A lower voltage set point results in less current through the field coil and the rectified output voltage of the alternator decreases.

The voltage regulator of the typical alternator is usually electrically connected to an ECM ("engine control module") of the vehicle. The ECM sends electronic signals to the voltage regulator that determine the operating state of the voltage regulator. For example, if the ECM determines that a component of the vehicle requires additional electrical power, then the ECM may send an electronic signal to the voltage regulator to increase the set point voltage. In general, the ECM sends signals to the voltage regulator, which optimize operation of the alternator for the current operating conditions of the vehicle.

The ECM and the voltage regulator are electrically connected by a wired electrical connection. The wires connecting the ECM to the voltage regulator extend from inside the vehicle cabin (where the ECM is typically located) to the alternator located in the vehicle engine compartment. Often, the wires are routed in a wire harness containing many other wires.

The wired connection between voltage regulator and the ECM is typically highly stressed. The vehicle engine compartment is an area subject to extreme condition. For example, in the summer months temperatures in and around the vehicle engine compartment may reach 120° C. In snowy climates, the salt used to treat icy winter roads is often drawn into the engine compartment and may cover most engine components, resulting in corrosion of metal components. These extreme conditions often result in corrosion and deterioration of components within the engine compartment. Moreover, the electrical connection between the voltage regulator and the ECM is stressed by movement of the engine relative to the vehicle frame during operation of the vehicle. This movement may stress the terminal or connector configured to connect the wire extending from the ECM to the alternator. Thus, the electrical connection between the voltage regulator and the ECM is highly stressed and is subject to corrosive elements, extreme high temperature, and extreme low temperatures.

The factors stressing the electrical connection between the voltage regulator and the ECM may, in some situations, result in a loss of electrical connection between the ECM and the voltage regulator caused by a break in the wire(s), a corroded terminal, or other electrical fault. When the electrical connection is lost, the ECM is unable to optimize operation of the alternator. Specifically, upon losing electrical connection with the ECM, the voltage regulator enters a default mode of operation that is suitable for vehicle operation, but causes the alternator to operate at a sub-optimal level. In the default mode the alternator may generate too much power or not enough power, because the voltage regulator is unable to receive the optimizing signals from the ECM. Moreover, operation of the alternator in the default mode may result in a rough or irregular engine idle.

Therefore, for at least the reasons set forth above, further developments in the area of vehicle alternators are desirable. It would be advantageous if such developments resulted in a more reliable vehicle electrical system. Additionally, it would be advantageous if such further developments could be implemented easily and with relatively little expense.

SUMMARY

According to one embodiment of the disclosure, an alternator is configured for use in a vehicle. The alternator includes a housing, a stator located within the housing, a field coil, a regulator, and a transceiver. The field coil is positioned in proximity to the stator and is configured for rotation relative to the stator. The regulator is electrically connected to the field coil and is configured to supply the field coil with an electrical signal based on a control signal. The transceiver is electrically connected to the regulator and is configured to wirelessly receive the control signal from an engine control module of the vehicle and to transmit the control signal to the regulator.

In another embodiment of the disclosure, an electrical system for a vehicle includes an engine control module, a plurality of vehicle sensors, a communications bus, and an alternator. The communications bus extends between the engine control module and the plurality of vehicle sensors. A first wireless transceiver is connected to the engine control module. The alternator includes a voltage regulator. The alternator is not connected to the communications bus. A second wireless transceiver is connected to the voltage regulator and in communication with the first wireless transceiver. The voltage regulator is configured to transmit signals to and receive signals from the engine control module via the first wireless transceiver and the second wireless transceiver.

In yet another embodiment of the disclosure, a vehicle includes an engine, an engine control module, and an alternator configured to convert mechanical energy from the engine into electrical energy. The alternator includes a stator, a field coil positioned in proximity to the stator and configured for rotation relative to the stator, and a regulator connected to the field coil and configured to supply the field coil with an electrical signal based on a control signal. A first wireless transceiver is connected to the regulator and is configured to transmit received signals to the regulator. The engine control module is configured to generate the control signal. A second wireless transceiver is connected to the engine control module. The second wireless transceiver is configured to receive the control signal from the engine control module and wirelessly transmit the control signal to the first wireless transceiver.

The above described features and advantages, as well as others, will become more readily apparent to those of ordinary skill in the art by reference to the following detailed description and accompanying drawings. While it would be desirable to provide an electrical system for a vehicle that provides one or more of these or other advantageous features, the teachings disclosed herein extend to those embodiments which fall within the scope of the appended claims, regardless of whether they accomplish one or more of the above-mentioned advantages or include such features.

DETAILED DESCRIPTION

Figure 1:
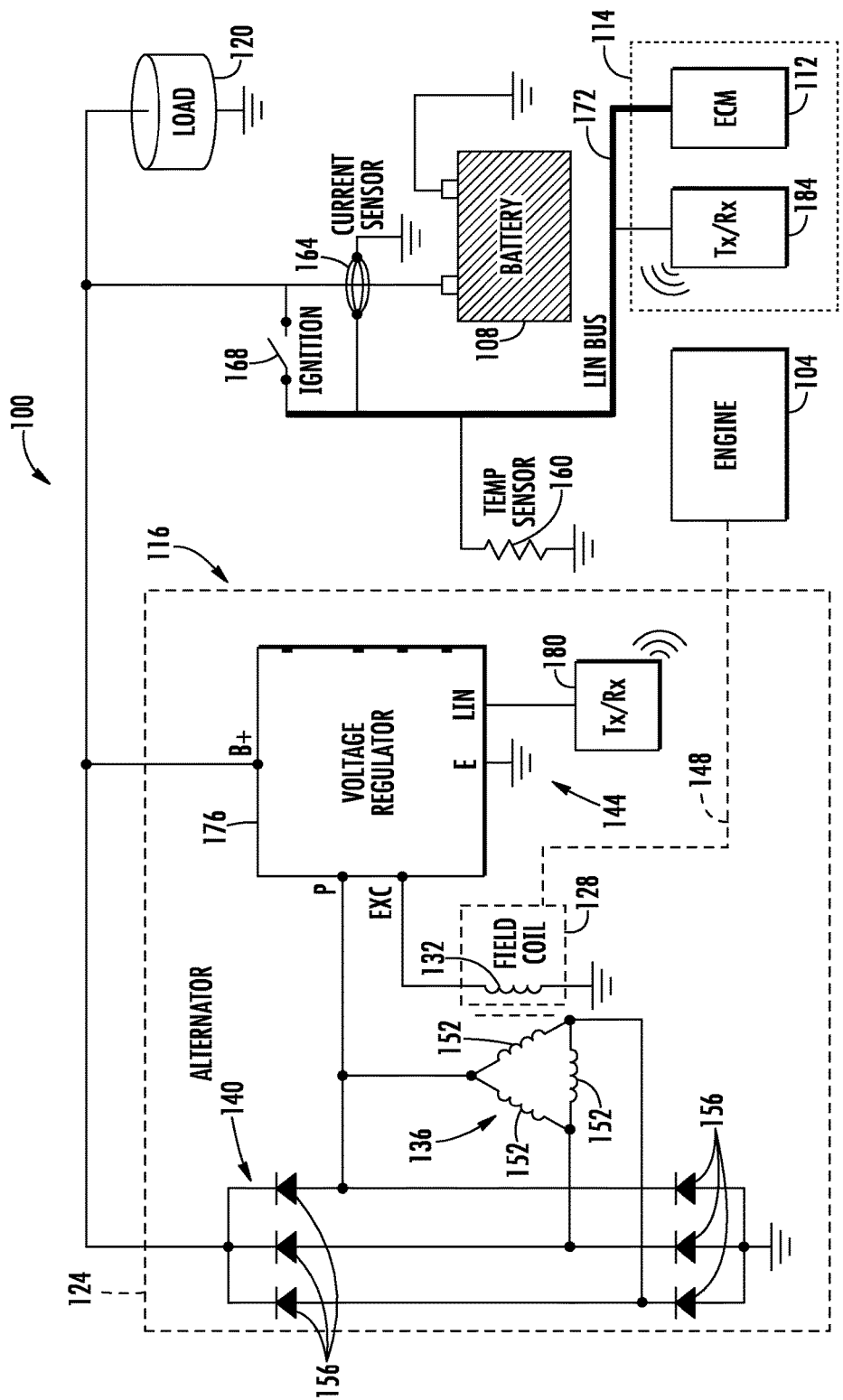
FIG. 1 is a block diagram view of an electrical system for a vehicle having an engine and an alternator assembly including a voltage regulator configured to communicate wirelessly over a LIN ("local interconnect network")

As shown in FIG. 1, in at least one embodiment a vehicle 100 includes an engine 104 and an electrical system comprising a battery 108, an ECM 112 ("engine control module), an alternator assembly 116, and an electrical load 120. The term "vehicle," as used herein, refers to any device configured to carry or to transport something or someone, including, without limitation, cars, trucks, busses, boats, trains, and planes. The term "engine," as used herein, includes any type of internal combustion engine suitable for powering the vehicle. The term "battery," as used herein includes any type of battery suitable for supplying electrical energy to the vehicle and the engine.

The alternator assembly 116 includes a metal frame/ housing 124, a rotor 128 including a field coil 132 mounted thereon, a stator 136, a rectifier assembly 140, and a voltage regulator assembly 144. In the embodiment of FIG. 1, the rotor 128 is located at least partially within the housing 124 and is configured for rotation relative to the housing 124 and the stator 136. A coupling device 148, such as an endless belt, couples the rotor 128 to the rotational output of the engine 104.

The stator 136 is also located at least partially within the housing 124. The stator 136 is fixed in position with respect to the housing 124. The stator 136 typically includes a plurality of windings 152. As shown FIG. 1, the stator 136 includes at least three windings 152 and is referred to as a three-phase stator. The stator 136 is configured to output a three-phase AC signal in response to rotation of the rotor 128 by the engine 104.

The rectifier assembly 140 is a three-phase full-wave bridge rectifier, but in other embodiments is provided as any desired type of rectifier. The rectifier assembly 140 includes a plurality of diodes 156 electrically connected to the stator 136, the electrical load 120, the voltage regulator assembly 144, and the battery 108. The diodes 156 are configured to rectify the three-phase AC signal generated by the stator 136. The rectified signal (i.e. the output of the rectifier assembly 140) is typically a single-phase DC signal that is suitable for charging the battery 108 and powering the load 120. Although the rectifier assembly 140 of FIG. 1 is shown as a three-phase full-wave bridge rectifier, it will be recognized that any of various other rectifier types may be used in association with the alternator assembly disclosed herein, including active rectification arrangements using actively controlled switches such as MOSFETs or other transistors.

The ECM 112 is a computer and/or microprocessor configured to control operation of the engine 104. In particular, the ECM 112 receives data from numerous vehicle sensors (e.g., temperature sensor 160, current sensor 164, and ignition switch sensor 168, etc.), processes the data, and attempts to optimize the operating efficiency of the engine 104 based on the processed data. The ECM 112 typically controls and optimizes the air/fuel ratio, the ignition timing, the idle speed, the valve timing, and the charging system, for example.

The ECM 112 connected to various vehicle sensors including the temperature sensor 160, the current sensor 164, the ignition switch sensor 168, and other vehicle sensors (not shown) via a communications bus in the form of a LIN bus 172. The temperature sensor 160 is configured to determine a vehicle temperature at one or more vehicle locations, such as the engine 104 or the alternator 116. The current sensor 164 is configured to detect an amount of current flowing from the battery 108, or other location in the electrical system of the vehicle. The ignition switch sensor 168 is configured to provide an indication of the status of the ignition switch (e.g., open or closed). In the embodiment of FIG. 1, the LIN 172 extends from the ECM 112 to each of the vehicle sensors 160, 164, 168, and is designed and configured to conduct electricity, and particularly electrical signals between the ECM 112 and the vehicle sensors 160, 164, 168. In this manner, the LIN bus 172 provides a communication link between the ECM 112 and the vehicle sensors 160, 164, 168. Accordingly, the ECM 112 sends data to the sensors 160, 164, 168 over the LIN bus 172 and receives data from the sensors 160, 164, 168 over the LIN bus 172.

Figure 2:
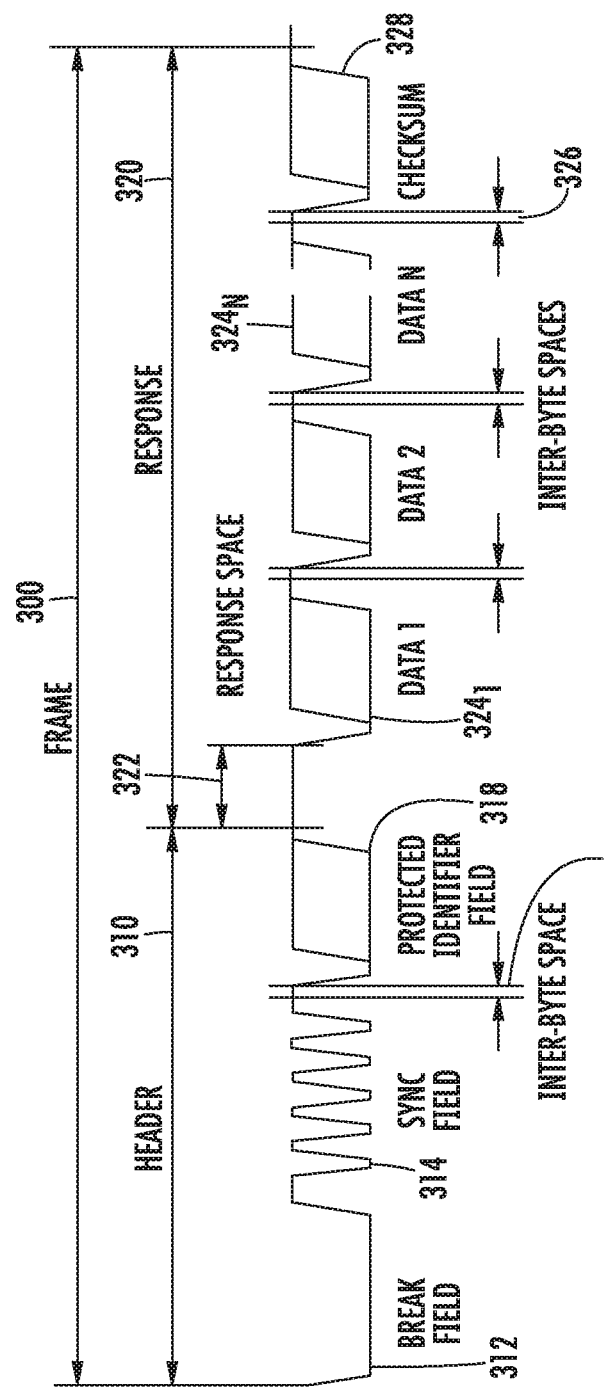
FIG. 2 illustrates an exemplary LIN data frame.

The ECM 112 and the vehicle sensors 160, 164, 168 communicate over the LIN bus 172 according to the LIN communication protocol. As shown in FIG. 2, an exemplary data frame 300 of the LIN communication protocol includes a header portion 310 and a response portion 320. The header portion 310 includes a break field 312, a sync field 314, an inter-byte space 316, and a protected identifier field 318. The response portion 320 includes a response space 322, data fields 324 (including $324_1$-$324_N$), each data field 324 terminated by an inter-byte space 326, and a checksum 328. The LIN communication protocol is a serial network protocol that is configured to operate with one master device and up to sixteen slave devices. Typically, the ECM 112 is the master device and the sensors 160, 164, 168 are the slave devices. The LIN communication protocol is a single wire communication protocol.

The voltage regulator assembly 144, in the embodiment of FIG. 1, also communicates with the ECM 112 over the LIN bus 172. The voltage regulator assembly 144 includes a voltage regulator 176, a wireless transceiver 180 located at the voltage regulator, and a wireless transceiver 184 located at the LIN bus 172. The voltage regulator 176 in the embodiment of FIG. 1 is a LIN voltage regulator (also referred to as a LIN regulator or simply a regulator) and is configured to communicate with the ECM 112 using the LIN bus 172. The voltage regulator 176 is an integrated circuit having a plurality of leads or terminals including at least B+, P, EXC, E, and LIN. In the embodiment of FIG. 1, terminal B+ is connected to the positive terminal of the battery 108 to sense the battery voltage. Terminal P is electrically connected to the stator 136 and to the rectifier assembly 140 to sense the output voltage of the alternator assembly 116. Terminal E is electrically connected to circuit ground. Terminal LIN is configured to transmit and to receive data according to the LIN communication protocol. Terminal LIN is electrically connected to the regulator transceiver 180 with a wired electrical connection.

The voltage regulator 176 is configured to optimize the output voltage of the stator 136 (i.e. the output voltage of the alternator assembly 116) by adjusting the voltage supplied to the field coil 132 in response to data sent to the terminal LIN by the ECM 112. In other embodiments, the voltage regulator 176 may include different, additional, or less terminals as required by the particular vehicle with which the regulator assembly 144 is associated. Moreover, in other embodiments, the regulator transceiver 180 is included within a chip housing (not shown) of the voltage regulator 176.

The regulator transceiver 180 is connected to the terminal LIN of the voltage regulator 176. The regulator transceiver may be located in the housing 124 of the alternator assembly 116 in a location that is suitable for receiving and transmitting a wireless signal. In at least one embodiment, the regulator transceiver 180 is commonly housed within the same electronics package that retains the voltage regulator 176 or is integrated as part of the voltage regulator 176. Although not illustrated, in some embodiments, an antenna is electrically connected to the regulator transceiver 180 and is configured to extend from the housing 124. The regulator transceiver 180 is supplied with electrical energy from either the voltage regulator 176 or the battery 108. In at least one alternative embodiment, the regulator transceiver 180 is housed outside of the alternator assembly 116. For example, the regulator transceiver 180 may be attached to the housing of the alternator assembly 116 or positioned in close proximity thereto.

The regulator transceiver 180 is configured to wirelessly transmit data to the bus transceiver 184 from the terminal LIN of the voltage regulator 176. Also, the regulator transceiver 180 is configured to wirelessly receive data from the bus transceiver 184 and to transmit the received data to the terminal LIN of the voltage regulator 176. The regulator transceiver 180 is configured to efficiently transmit and receive data even in response to electrical noise generated by the rectifier assembly 140, the field coil 132, the stator 152, and other components of the engine 104.

The bus transceiver 184 is electrically connected to the LIN bus 172 with a wired electrical connection. The bus transceiver 184 is located in a region of the vehicle 100 that is suitable for transmitting and receiving data from the regulator transceiver 180. The bus transceiver 184 is supplied with electrical energy from the battery 108, the ECM 112, or any other suitable electrical component. In one embodiment, the bus transceiver 184 is located in an engine compartment of the vehicle 100 near the LIN bus 172 to effectively reduce the length of the wired electrical connection between the bus transceiver 184 and the LIN bus 172. For example, the bus transceiver 184 is located within thirty centimeters of the LIN bus 172. In another embodiment, the bus transceiver 184 is located in the vehicle cabin 114 near the ECM 112. For example, the bus transceiver 184 is located within thirty centimeters of the ECM 112. In at least one embodiment, the bus transceiver 184 is commonly housed with the ECM 112 or is integrated as part of the ECM. Although not illustrated, in some embodiments, an antenna is electrically connected to the bus transceiver 184.

The wireless transceivers 180, 184 are configured for wireless data transfer according to any desired wireless communication protocol. In one embodiment, the transceivers 180, 184 utilize the Bluetooth wireless communication protocol. Thus, the transceivers 180, 184 are configured to convert the serial LIN data to Bluetooth data for wireless transmission and then convert the Bluetooth data back to serial LIN data for wired transmission to the voltage regulator 176 or the LIN bus 172.

In operation, the ECM 112 optimizes operation of the alternator assembly 116 by wirelessly sending and receiving data according to the LIN protocol to the voltage regulator 176 using the transceivers 180, 184. The transceivers 180, 184 eliminate the direct wired connection of the voltage regulator 176 to the LIN bus 172 that exists in the typical installation. Instead, LIN data generated by the ECM 112, according to the data frame of FIG. 2, is transmitted through the LIN bus 172 to the bus transceiver 184. The bus transceiver 184 converts the LIN data to a format that is suitable for wireless transmission and then transmits the data to the regulator transceiver 180. The regulator transceiver 180 wirelessly receives the data and converts the data back to the LIN data generated by the ECM 112. Then the regulator transceiver 180 transmits the LIN data to the voltage regulator 176. Accordingly, the bus transceiver 184 is configured to wirelessly transmit a control signal from the ECM 112 to the regulator transceiver 180; thereafter, the control signal is transmitted from the regulator transceiver 180 to the regulator 176 via the wired connection between the regulator transceiver 180 and the regulator 176. Additionally, LIN data generated by the voltage regulator 176 is wirelessly transmitted to the ECM 112 according to a similar procedure. Specifically, the voltage regulator 176 generates LIN data and transmits the LIN data to the regulator transceiver 180. The regulator transceiver 180 converts the LIN data to a format suitable for wireless transmission to the bus transceiver 184. Upon receiving the data, the bus transceiver 184 converts the data back to the LIN data generated by the voltage regulator 176 and then transmits the LIN data to the ECM 112 on the LIN bus 172.

Exemplary LIN data include the field coil current, field coil current limit, field coil voltage set point, field coil voltage set point commanded, field duty cycle, magnitude of the voltage and current of the stator 136, temperature of the alternator assembly 116, temperature of the voltage regulator 176, high temperature threshold adjustment, load response rate, load response cut off speed, load response control ("LRC") blind zone, communication timeout, communication error, mechanical rotation failure, alternator assembly identification, supplier identification, LIN regulator identification, and other electrical parameters of the alternator assembly 116. Accordingly, typical signals the voltage regulator 176 receives from the ECM 112 include those related to a voltage set point, load response rate, load response cut off speed, field current limit, high temperature threshold adjustment, LCR blind zone, or any of various additional requests for additional transmitted data. Typical signals the regulator may transmit include those related to field duty cycle, field current, generator identification, supplier identification, ASIC ("application-specific integrated circuit") identification, voltage set point, voltage set point commanded, and temperature of the integrated circuit, etc. In addition, the regulator may transmit error flag signals related to a communication timeout, no LIN communication received, high integrated circuit temperature, mechanical rotation failure, low or high voltage, or any of various other error flags.

The transceivers 180, 184 communicate with the LIN bus 172 without any modification to the LIN bus 172 or to the LIN communication protocol. Specifically, the bus transceiver 184 appears on the LIN bus 172 (and to the connected ECM master) as at least one slave device. In the illustrated embodiment, the bus transceiver 184 appears as the voltage regulator 176 to the LIN bus 172; however, the actual voltage regulator 176 is located some distance from the bus transceiver 184 and is wirelessly connected to the LIN bus 172 through the transceivers 180, 184.

The wireless voltage regulator 176 offers advantages over traditional wired voltage regulators. For example, the voltage regulator 176 is not subject to failure in response to corrosion of a wired connection. Instead, the wireless connection between the voltage regulator 176 and the ECM 112 is robust and not subject to degradation over time or in harsh conditions. The voltage regulator 176 is also simpler and less expensive to install, because the voltage regulator 176 does not include a wire and a wire harness extending from the LIN bus 172 to the voltage regulator 176. The reliable connection between the voltage regulator 176 and the LIN bus 172 ensures that the ECM 112 is able to optimize the settings of the voltage regulator 176 and to prevent the voltage regulator from entering the default mode of operation even in the harshest of operating conditions.

Figure 3:
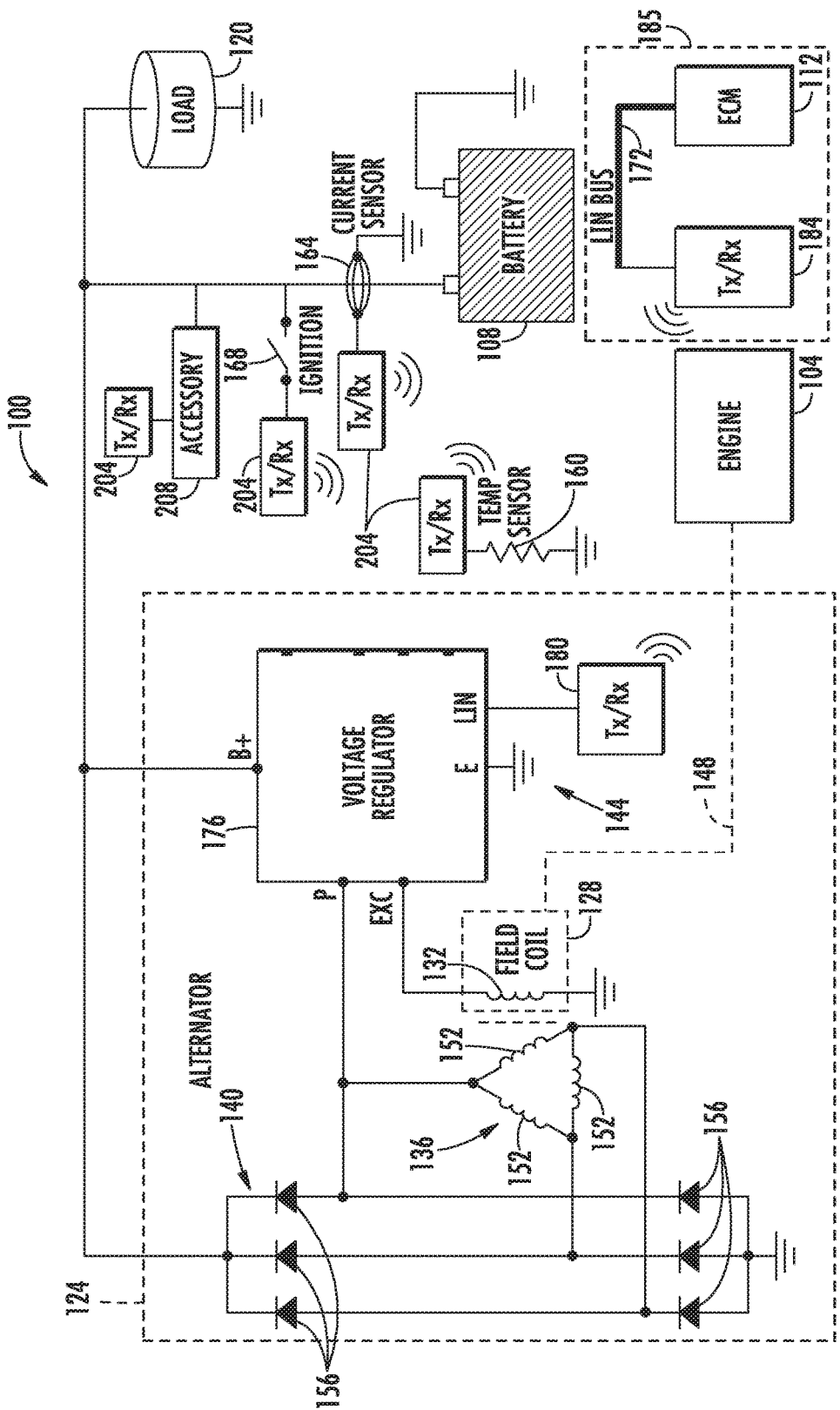
FIG. 3 is a block diagram view of an electrical system for a vehicle having an engine, an alternator assembly including a wireless voltage regulator, and a plurality of sensors and accessories each configured to communicate wirelessly over a LIN.

As shown in FIG. 3, another embodiment of the vehicle 200 includes a plurality of sensor transceivers 204 each associated with a LIN sensor 160, 164, 168 or accessory 208. Specifically, in addition to the alternator assembly 116 and bus transceiver 184 described above, the vehicle 200 includes a sensor transceiver 204 associated with the temperature sensor 160, a sensor transceiver 204 associated with the current sensor 164, a sensor transceiver 204 associated with the ignition switch sensor 168, and a sensor transceiver 204 associated with a vehicle accessory 208. The sensor transceivers 204 are substantially the same as the regulator transceiver 180 and are configured to send and to receive LIN data from the bus transceiver 184. Accordingly, the sensor transceivers 204 eliminate multiple wired connections between the sensors 160, 164, 168, the accessory 208, and the LIN bus 172.

In FIG. 3, the bus transceiver 184 appears on the LIN bus 172 (and to the associated ECM master) as a plurality of slave devices. The bus transceiver 184 is configured to simultaneously communicate with each sensor transceiver 204 and the regulator transceiver 180. Moreover, the bus transceiver 184 is configured to interface with the LIN bus 172, such that it appears to the ECM 112 that each sensor 160, 164, 168, accessory 208 and the voltage regulator 176 is electrically connected to the LIN bus 172. In such embodiment, the bus transceiver 184 and the ECM 112 may both be retained within a single housing 185. Alternatively, the bus transceiver 184 and the ECM may be retained in separate housings.

The accessory 208 represents any device that utilizes the LIN communication protocol. Accordingly, the accessory 208 may include a power mirror controller, a power window controller, a wiper blade controller, a power sunroof controller, a power steering controller, a power seat controller, an in vehicle entertainment system, a climate control system, a rear view mirror controller, a power lock controller, a controller for operating air shutters, or any other LIN device.

The vehicle 200 reduces the cost and increases the reliability of LIN devices 160, 164, 168, 176, 204. Cost is reduced because the LIN devices 160, 164, 168, 176, 204 are much simpler to install and maintain. For example, the LIN bus 172 is typically most easily accessible at the front of the vehicle 100, whereas certain LIN devices, such a rear window wiper controller, are located at the far rear of the vehicle. Traditionally, a wire is run from the wiper controller to the LIN bus 172 along an indirect and lengthy path. The transceivers 180, 184, 204 eliminate such a wire and enable the wiper controller to wirelessly communicate with the LIN bus 172. Accordingly, instead of requiring a wired electrical connection from each LIN device 160, 164, 168, 176, 204 to the LIN bus 172, wires are eliminated and the LIN devices communicate wirelessly with the LIN bus 172 via the transceivers 180, 184, 204.

As described herein, the alternator assembly 116 wirelessly transmits data associated with the LIN communication protocol. In other embodiments, however, the alternator assembly 116 is configured to wirelessly transmit data of any communication protocol used by the alternator assembly 116, the ECM 112, the sensors 160, 164, 168, and the accessories 204. For example, instead of the LIN communication protocol, the alternator assembly 116 may wirelessly transmit data associated with the controller area network (CAN) protocol, the COM protocol, the RVC (Regulated Voltage Control) protocol, or any other protocol that may be developed in the future. Similarly, while the communications bus has been described in the embodiments above as an LIN bus 172, in other embodiments, the communications bus may be a communications bus operating under a different communication protocol, such as the CAN protocol, the COM protocol, or the RVC protocol.

While the invention has been described with reference to exemplary embodiments, it will be understood by those skilled in the art that other implementations and adaptations are possible. For example, various changes may be made and equivalent elements may be substituted for elements thereof without departing from the scope of the invention. In addition to the foregoing examples, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of this disclosure.

What is claimed is:

1. An electrical system for a vehicle comprising:
an engine control module;
a communications bus connected to the engine control module;
a first wireless transceiver connected to the engine control module and commonly housed with the engine control module within a cabin of the vehicle;
an alternator including a voltage regulator, wherein the alternator is not connected to the communications bus; and
a second wireless transceiver housed within the alternator and connected to the voltage regulator, the second wireless transceiver configured for wireless communication with the first wireless transceiver, the voltage regulator configured to transmit signals to and receive signals from the engine control module via the first wireless transceiver and the second wireless transceiver.

2. The electrical system of claim 1 further comprising a plurality of vehicle sensors.

3. The electrical system of claim 2 wherein the plurality of vehicle sensors are connected to the communications bus.

4. The electrical system of claim 2 wherein the plurality of vehicle sensors are not connected to the communications bus, and wherein the first wireless transceiver is configured for wireless communication with the plurality of vehicle sensors.

5. The electrical system of claim 2 wherein the plurality of vehicle sensors include a temperature sensor, a current sensor, and an ignition sensor.

6. The electrical system of claim 1 wherein the first wireless transceiver is connected to the engine control module via the communications bus.

7. The electrical system of claim 1 wherein the communications bus is a LIN bus.

8. An alternator configured for use in a vehicle, the alternator comprising:
 an alternator housing;
 a stator located within the housing;
 a field coil positioned in proximity to the stator and is configured for rotation relative to the stator;
 a regulator connected to the field coil and configured to supply the field coil with an electrical signal based on a received control signal;
 a first wireless transceiver connected to the regulator and configured to wirelessly receive the control signal from a second wireless transceiver connected to an engine control module of the vehicle, the first wireless transceiver further configured transmit the control signal to the regulator;
 wherein the first wireless transceiver is located within the alternator housing and the second wireless transceiver is located outside of the alternator housing.

* * * * *